J. C. KIMERER.
INSIDE TRIMMING MACHINE FOR TRIMMING WOODEN HANDLES FOR TOOLS AND THE LIKE.
APPLICATION FILED SEPT. 1, 1911.
1,128,610.
Patented Feb. 16, 1915.
3 SHEETS—SHEET 1.
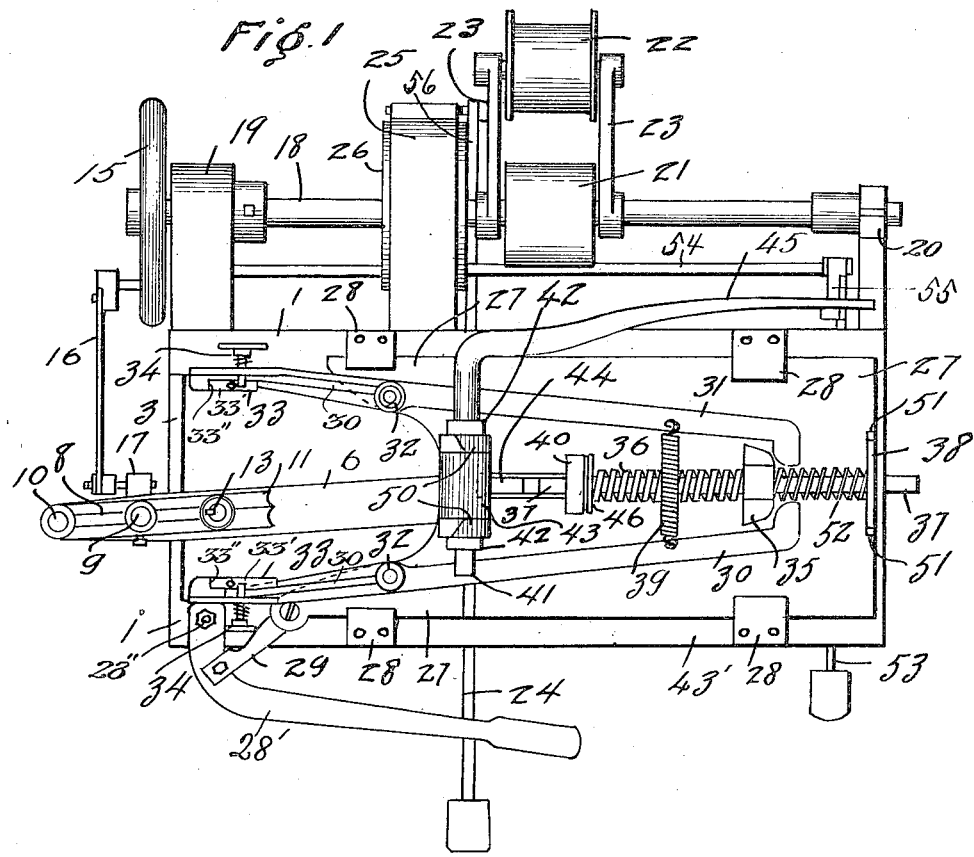
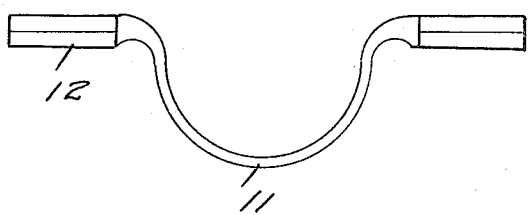

J. C. KIMERER.
INSIDE TRIMMING MACHINE FOR TRIMMING WOODEN HANDLES FOR TOOLS AND THE LIKE.
APPLICATION FILED SEPT. 1, 1911.
1,128,610. Patented Feb. 16, 1915.
3 SHEETS—SHEET 2.
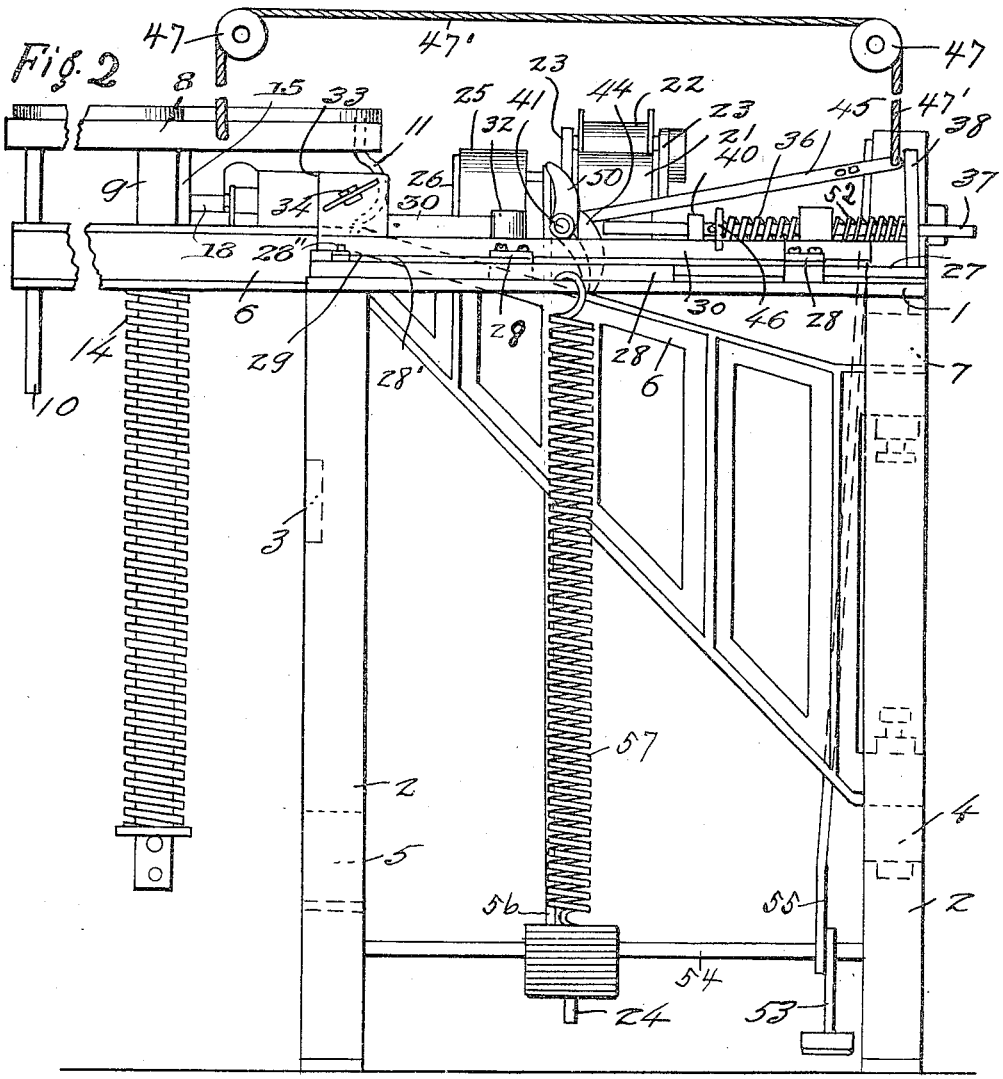

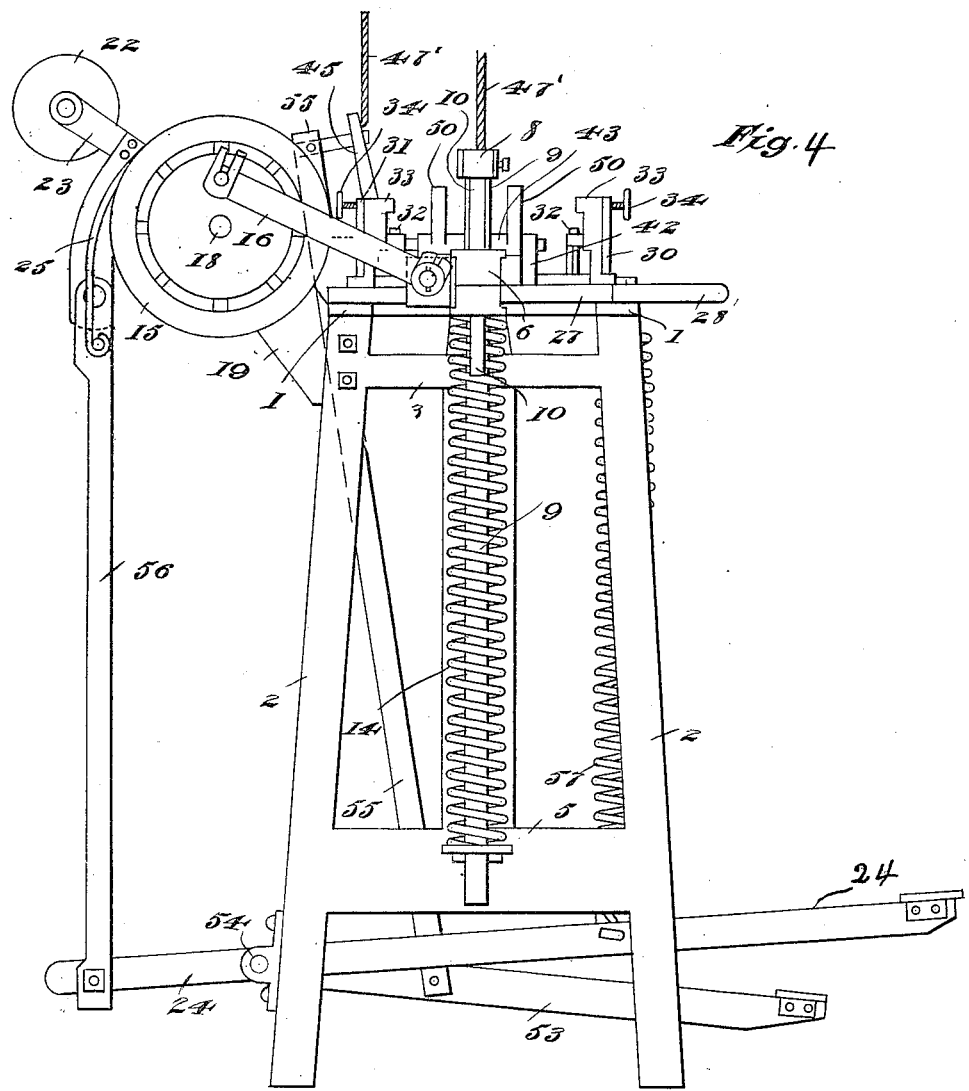
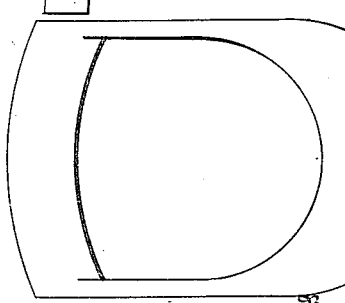
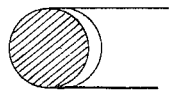

UNITED STATES PATENT OFFICE.

JOSEPH C. KIMERER, OF PARIS, TEXAS.

INSIDE-TRIMMING MACHINE FOR TRIMMING WOODEN HANDLES FOR TOOLS AND THE LIKE.

1,128,610. Specification of Letters Patent. Patented Feb. 16, 1915.

Application filed September 1, 1911. Serial No. 647,271.

*To all whom it may concern:*

Be it known that I, JOSEPH C. KIMERER, a citizen of the United States, residing at Paris, in the county of Lamar and State of Texas, have invented certain new and useful Improvements in Inside-Trimming Machines for Trimming Wooden Handles for Tools and the like, of which the following is a specification.

My invention relates to trimming machines and more particularly to machines for trimming the inside portions of wooden tools or handles, such as handles for spades, shovels, and like articles, and the object is to provide a simple machine which will be highly efficient and extremely accurate in trimming the curved interior portions of tools and similar parts of tools or handles, and which machine will be simple in operation and provided with means by which the machine is adjusted into and out of operative positions.

Other objects and advantages will be fully explained in the following description and the invention will be more particularly pointed out in the claims.

Reference is had to the accompanying drawings which form a part of this application and specification.

Figure 1 is a plan view of the machine. Fig. 2 is a side elevation of the same. Fig. 3 is a detail view of the trimming blade. Fig. 4 is an end elevation of the machine from the left side of Fig. 2. Fig. 5 is a view of a part of a spade handle and Fig. 6 is a section of the part which is trimmed by the machine. Fig. 7 is a cross section of the blade 11.

Similar characters of reference are used to indicate the same parts throughout the several views.

The machine is provided with a frame having a platform 1 and upright legs or posts 2 on which the platform is firmly supported. The platform is bifurcated, for purposes hereinafter explained, and a cross-bar 3 at the bifurcated end of the platform 1 makes the platform 1 rigid. Other braces are provided in the cross-bars 4 and 5. An oscillating blade carrier consisting of a bar or frame 6 pivotally mounted on cross bars 4 and 7, a blade holder 8, a spring controlled chucking bar 9, and guide pin or rod 10. The blade 11 is rigid with the holder 8 and the bar 6 has a socket into which the lower shank 12 enters loosely. The blade is prevented from turning in the holder 8 by a key 13. The blade 11 is curved to the curvature of the article to be trimmed and has two cutting edges, one on each side, so that the blade cuts in moving both ways. It is apparent that the blade 11 can be varied in form to adapt the same for cutting or trimming different shapes. The rod 9 is the chucking bar, but the actual chucking is accomplished by the spring 14 which holds the blade 11 in operative position and brings the same back to operative position, as hereinafter explained. The carrier is oscillated or vibrated by a crank wheel 15 and a pitman rod 16 which is pivotally connected to the wheel 15 and to a lug 17 which is rigid with the bar 6. The crank wheel 15 is driven by the shaft 18 which is journaled in bearings 19 and 20 which are rigid with the platform 1. The shaft 18 is driven by a pulley 21. The pulley wheel 21 is provided with means for driving from power above. An idle pulley wheel 22 is journaled in arms 23 which are pivotally connected to shaft 18. This pulley wheel 22 is used to tighten a belt on the pulley wheel 21. A foot lever 24 is connected to the arms 23 for operating the idler 22. A brake 25 is also provided and engages a wheel 26 which is rigid with shaft 18. With the mechanism thus described the blade 11 is vibrated or oscillated for cutting or trimming purposes.

Means are provided for holding articles to be trimmed and for inserting and removing the articles. A shiftable frame 27 is mounted on the frame 1. Guides 28 prevent lateral displacement of the frame 27. The frame 27 is movable on the frame 1 by a lever 28′ which is pivoted on the frame 1 at 28″. A link bar 29 is pivotally connected to the frame 27 and to the lever 28′. By means of the lever 28′ the frame 27 can be reciprocated on the frame 1. The frame 27 carries the means for holding the article to be operated upon. The article to be operated upon is clamped by a pair of arms 30 and 31 which are pivotally mounted on studs 32 which are rigid with the frame 27. Standards 33 are bolted rigidly to the arms 30 and 31 and hand screws 34 are mounted in these plates for engaging the article to be operated upon and these screws are projected against the sides of the article with sufficient force to hold the article while being trimmed by the blade 11, which is being vibrated by the wheel 15. The standards 33 have horizontal shoulders 33' and vertical shoulders 33'' to receive and hold the work in place. The screws 34 are held against the article by a wedge 35 which is being forced between the ends of the arms 30 and 31 by a spiral spring 36 which is mounted on a rod 37 which is slidably mounted in a bearing 40 and in a holder 38, both of which are rigid with the plate 27. The spreading of the arms 30 and 31 by means of the wedge 35 forces the screws 34 against the article to be trimmed. (The arms 30 and 31 are pressed normally toward each other by a compression spring 39 which is attached to both arms). This will open the arms at the opposite end so that the article to be trimmed will be received between the screws 34. The arms or levers 30 and 31 swing in a horizontal plane on their fulcrums 32. Provision is made for applying power or pressure to the rod 37. A shaft 41 is journaled in bearings 42 which are rigid with frame 27. A sleeve 43 is rigidly mounted on the shaft 41 and a cam 44 is formed integral with the sleeve 43. The shaft 41 is provided with a crank 45. When the crank 45 is turned the cam 44 will drive the rod 37. The spring 36 will be forced against the wedge 35 by means of the washer 46 which forms a seat for the spring 36. The crank 45 is operated automatically by the spring 14 in the following manner: A cable 47' is attached to the bar or blade holder 8 and run over pulley wheels 47 and then attached to the crank 45. The spring 14 will pull the bar 8 down and pull the crank 45 up. This will press the cam 44 against the end of the rod 37 and thus compress the spring 36 and wedge the arms 30 and 31 open at the power end. At the same time the lower shank 12 of the blade 11 is forced into its socket in the bar 6. The sleeve 43 also has upstanding fingers 50 integral therewith. These fingers 50 are holders for articles to be trimmed. The holder 38 has fingers 51 integral therewith for holding articles in place to be trimmed. The part of an article to be trimmed is clamped securely in place with the surface thereof in the path of the blade 11, or to bear against said blade while the blade is being vibrated, by the screws 34 and the other part of the article, as a shovel or spade handle lies between the fingers 50 and between the fingers 51. The arms 30 and 31 are automatically replaced to inoperative position by the spring 39 and by a spring 52 mounted on rod 37 when the pressure of cam 44 is released from the rod 37, that is, the spring 52 will force the wedge 35 from the arms 30 and 31 and the spring 39 will draw the power ends of arms 30 and 31 toward each other and thus draw screws 34 away from the work being done.

To operate the machine: Force the lever 28' close to the platform 1. The arms 30 and 31 will be spread at the clamping ends. Place the handle or other article to be trimmed in place between the fingers 50 and between fingers 51 with the part to be trimmed between the screws 34. Then put the foot on lever 53 and press down. The lever 53 will actuate the lever 45 through the link 55 and the lever 45 will, by means of the sleeve 43, actuate the cam 44 to move the rod 37 which carries the wedge 35. This will force the wedge 35 by means of cam 44 between the ends of the arms 30 and 31 and thus force the points of the screw bolts 34 into the sides of the material to be operated upon and at the same time raise the blade 11 up high enough for the piece of material to be moved under the blade in position to be operated upon and while the foot is still on the lever 53, by means of lever 28' shift the frame 27 which carries arms 30 and 31 to bring the material past the blade 11. Then release the foot lever 53. The spring 14 will immediately chuck the shank 12 of blade 11 back into the socket in bar 6. The work or material is now in position to be trimmed. The arms 30 and 31 are now held in operative position by the wedge 35 which is held in position by the rod 37 pressing against the cam 44, the frame 27 having been shifted far enough to force the rod 37 against the cam 44. The next step is to press the foot lever 24. This will, by means of link bar 56 and spring 57, free the brake 25 from the brake wheel 26 and at the same time tighten the belt on drive pulley 21 by means of the idle pulley 22. This will start the vibration of the blade 11. As soon as the blade has trimmed the material sufficiently, release foot lever 24. This will apply the brake 35 and release pulley 21 and thus stop the machine from driving blade 11. Then press on foot lever 53. This will raise the blade 11. Then by lever 28' shift the frame 27 with arms 30 and 31 out of operative position so that the finished piece can be removed and a new piece placed in the machine. Release the foot lever 53 while the change of material is being accomplished. Then proceed as above described. The foot lever 53 is connected to a shaft 54 and the lever 45 is connected to a link bar 55 which is connected to lever 53. The foot lever 24 is also connected to the shaft 54 and a link bar 56 is connected to the lever 24 and pivotally connected to the brake 25 and also connected to one arm 23 for moving idler 22.

Having fully described my invention, what I claim as new and desire to secure by Letters Patent, is,—

1. A wood trimming machine comprising a platform and upright supports therefor, a shiftable frame mounted on said platform, stock-holding and clamping devices carried by said frame, a vibrating bar pivoted to said supports, a blade and blade holder carried by said bar, and means for moving said blade in and out of operative position consisting of rods rigid with said holder and movable vertically through said bar and means for moving said holder vertically.

2. A wood trimming machine comprising a platform and supports therefor, a shiftable frame mounted on said platform, stock-holding and clamping devices carried by said frame, a blade operable between said clamping devices, a blade holder, means for moving said blade in and out of operative position consisting of a rod rigid with said holder and a guide rod for said holder and means for moving said holder vertically, and means for vibrating said blade between said clamping devices.

3. A wood trimming machine comprising a platform, a longitudinally shiftable frame horizontally disposed on said platform, clamping devices carried by said frame for holding material or stock to be trimmed, a blade, and a movable holder for vibrating said blade between and in the plane of said clamping devices.

4. A wood trimming machine comprising a platform, a frame mounted on said platform, clamping devices carried by said frame for holding stock to be trimmed, a blade, a movable holder for vibrating said blade between and in the plane of said clamping devices, and means for longitudinally shifting said frame to move said clamping devices in or out of operative position.

5. A wood trimming machine comprising a platform, a frame mounted on said platform, means for holding stock to be trimmed, a blade, a vibrating bar pivoted at one end for supporting means for vibrating said bar, the said blade, and chucking devices for said blade consisting of a vertically movable bar and guides therefor movable through said vibrating bar, means for moving said bar out of operative position, and a spring on one of said guides to bring said blade to operative position.

6. A wood trimming machine comprising a platform, means mounted on said platform for holding material to be trimmed, a blade and a carrier therefor, a vibrating bar pivoted at one end for supporting said blade and having a socket therein for said blade, guides for said blade carrier movable through said vibrating bar, and a spring on one of said guides for holding said blade in operative position.

7. A wood trimming machine having a platform, means mounted on said platform for holding material rigidly to be trimmed, a blade and a carrier therefor, a vibrating bar pivoted at one end and having a socket therein for one shank of said blade, the other shank of said blade being rigid in said carrier, guides for said carrier movable through said vibrating bar, a spring on one of said guides for holding said blade in operative position, a crank wheel, and a pitman bar pivotally connected to the free end of said vibrating bar and to said crank wheel for operating said vibrating bar.

8. A wood trimming machine having a platform, means mounted on said platform for supporting material to be trimmed, spring-actuated clamping devices for holding material to be trimmed, a blade and a carrier therefor, means for adjusting said blade and its carrier, means for vibrating said blade, a cam and a shaft therefor, and a foot lever operatively connected to said shaft and to said blade carrier for simultaneously adjusting said chucking devices and causing said cam to actuate said clamping devices.

In testimony whereof, I set my hand in the presence of two witnesses, this 19 day of August, 1911.

JOSEPH C. KIMERER.

Witnesses:
W. A. HUTCHISON,
WILL. HULL.

Copies of this patent may be obtained for five cents each, by addressing the "Commissioner of Patents, Washington, D. C."